(12) United States Patent
Meszko

(10) Patent No.: US 6,327,299 B1
(45) Date of Patent: Dec. 4, 2001

(54) METHOD AND SYSTEM FOR MEASURING AND ADJUSTING THE QUALITY OF AN ORTHOGONAL TRANSMIT DIVERSITY SIGNAL IN A WIRELESS COMMUNICATIONS SYSTEM

(75) Inventor: William Robert Meszko, Fort Worth, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/387,107

(22) Filed: Aug. 31, 1999

(51) Int. Cl.[7] .............................. H04K 1/00; H04L 1/02; H04L 7/00
(52) U.S. Cl. ......................... 375/149; 375/355; 375/267
(58) Field of Search ................................ 375/149, 267, 375/347, 295, 224, 228, 147, 145, 355, 140; 370/208, 209

(56) References Cited

U.S. PATENT DOCUMENTS

| | | | |
|---|---|---|---|
| 4,395,772 | * | 7/1983 | Trested, Jr. ........................... 375/267 |
| 5,402,450 | * | 3/1995 | Lennen ................................. 375/343 |
| 5,648,968 | * | 7/1997 | Reudink ............................... 370/335 |
| 5,689,271 | * | 11/1997 | Lennen ................................. 342/357 |
| 5,691,974 | * | 11/1997 | Zehavi et al. ........................ 370/209 |
| 5,887,028 | * | 3/1999 | Araki ..................................... 375/224 |
| 5,983,113 | * | 11/1999 | Asanuma ............................. 455/506 |

* cited by examiner

Primary Examiner—T. Bocure
(74) Attorney, Agent, or Firm—Bruce Terry; Kenneth A. Haas

(57) ABSTRACT

In a wireless communications system using orthogonal transmit diversity, wherein the orthogonal transmit diversity signal is produced by a transmitter having first and second radio frequency diversity signals for transmitting from first and second transmit diversity antennas, a radio frequency sample signal that represents the sum of the first and second radio frequency diversity signals is produced. The radio frequency sample signal is then down-converted to produce a down-converted signal having first and second components corresponding to the first and second radio frequency diversity signals, respectively. Thereafter, a first time reference of the first radio frequency diversity signal is recovered from the first component. Finally, a characteristic of the second component that is indicative of a difference in delay between the first and second radio frequency diversity signals is measured using the first time reference.

14 Claims, 3 Drawing Sheets

METHOD AND SYSTEM FOR MEASURING AND ADJUSTING THE QUALITY OF AN ORTHOGONAL TRANSMIT DIVERSITY SIGNAL IN A WIRELESS COMMUNICATIONS SYSTEM

FIELD OF THE INVENTION

The present invention is related in general to wireless communications, and more particularly to an improved method and system for measuring and adjusting the quality of an orthogonal transmit diversity signal in a wireless communications system.

BACKGROUND OF THE INVENTION

In a wireless communications system, a transmitter and a receiver communicate data through an air interface or channel. Such a wireless channel may be adversely affected by channel losses, multipath losses, fading, and interference from other radio frequency sources. In order to improve the efficiency of the wireless channel and mitigate the effects of channel-degrading phenomenon, a transmission scheme known as orthogonal transmit diversity has been proposed for use in spread spectrum communications systems, such as the so called "third generation cellular telephone system." Orthogonal transmit diversity has been described in detail in various contributions to standards organizations, such as the contribution by Motorola, Inc. entitled "Orthogonal Transmit Diversity for Direct Spread CDMA," contribution to ETSI (European Telecommunications Standards Institute) SMG2, Stockholm, Sweden, Sep. 15–17, 1997. In brief, orthogonal transmit diversity uses two or more antennas to transmit bit streams that have been spread using spreading codes that are orthogonal to one another. In one scheme, bits from a data source are commutated, or split, between two or more diversity branches in the transmitter. In another scheme, the same data is transmitted from both branches at half the conventional power. In both schemes the data is spread in one diversity branch using spreading codes that are orthogonal to the spreading codes used in any other diversity branch.

By using two or more antennas to transmit user data, diversity is added to the overall wireless channel. For example, if data transmitted from a first antenna experiences fading, there is some statistical probability that data transmitted from the second antenna will not experience the same fading condition. Therefore, the subscriber unit has an increased probability of receiving the correct data. Orthogonal spreading on the different antennas is used so that the subscriber units may receive each signal independently, which means that the diversity signals should not interfere with one another. This increases the sensitivity or gain of the receiver, allows lower power on the forward link, and increases the capacity of the system.

One problem in generating radio frequency diversity signals is controlling the timing, or delay, between signals transmitted on the two or more diversity antennas. This is a problem because orthogonality between the signals is degraded as the relative timing between the radio frequency diversity signals changes. In other words, these radio frequency diversity signals are most orthogonal when they have been spread with orthogonal codes referenced to the same system time, and that time reference is not shifted relative to other radio frequency diversity signals as the signal is filtered, up-converted, and amplified. Such timing shifts between radio frequency diversity signals may also be introduced with unequal lengths of cable between the transmitter and the diversity antennas. Although less likely, in some cases a difference in delay may be introduced as a result of errors in digital timing.

One method of controlling delay between diversity branches of an orthogonal transmit diversity transmitter is to strictly control the design and selection of components in portions of the transmitter likely to introduce delay. For example, in filters, up-converters, and amplifiers, designs may be implemented with precisely selected components that fall within strict specifications. The problem with this solution is that it is very expensive to specify and select components with such tight tolerances.

Similarly, cable lengths between the transmitter and the diversity antennas may be kept to equal lengths so that the relative delay between the signals is not changed. Here again there is a problem with accuracy and quality control in the installation of transmitter and antennas.

Therefore, it should be apparent that a need exists for an improved method and system for measuring and adjusting the quality of an orthogonal transmit diversity signal in a wireless communication system, wherein the effects of a difference in delay between radio frequency diversity signals may be detected, and a compensation for such delay may be introduced in the transmitter in order to minimize the effects of such delay.

BRIEF DESCRIPTION OF THE DRAWINGS

The novel features believed characteristic of the invention are set forth in the appended claims. The invention itself, however, as well as a preferred mode of use, further objects, and advantages thereof, will best be understood with reference to the following detailed description of an illustrative embodiment when read in conjunction with the accompanying drawings, wherein:

DETAILED DESCRIPTION OF THE INVENTION

Figure 1:
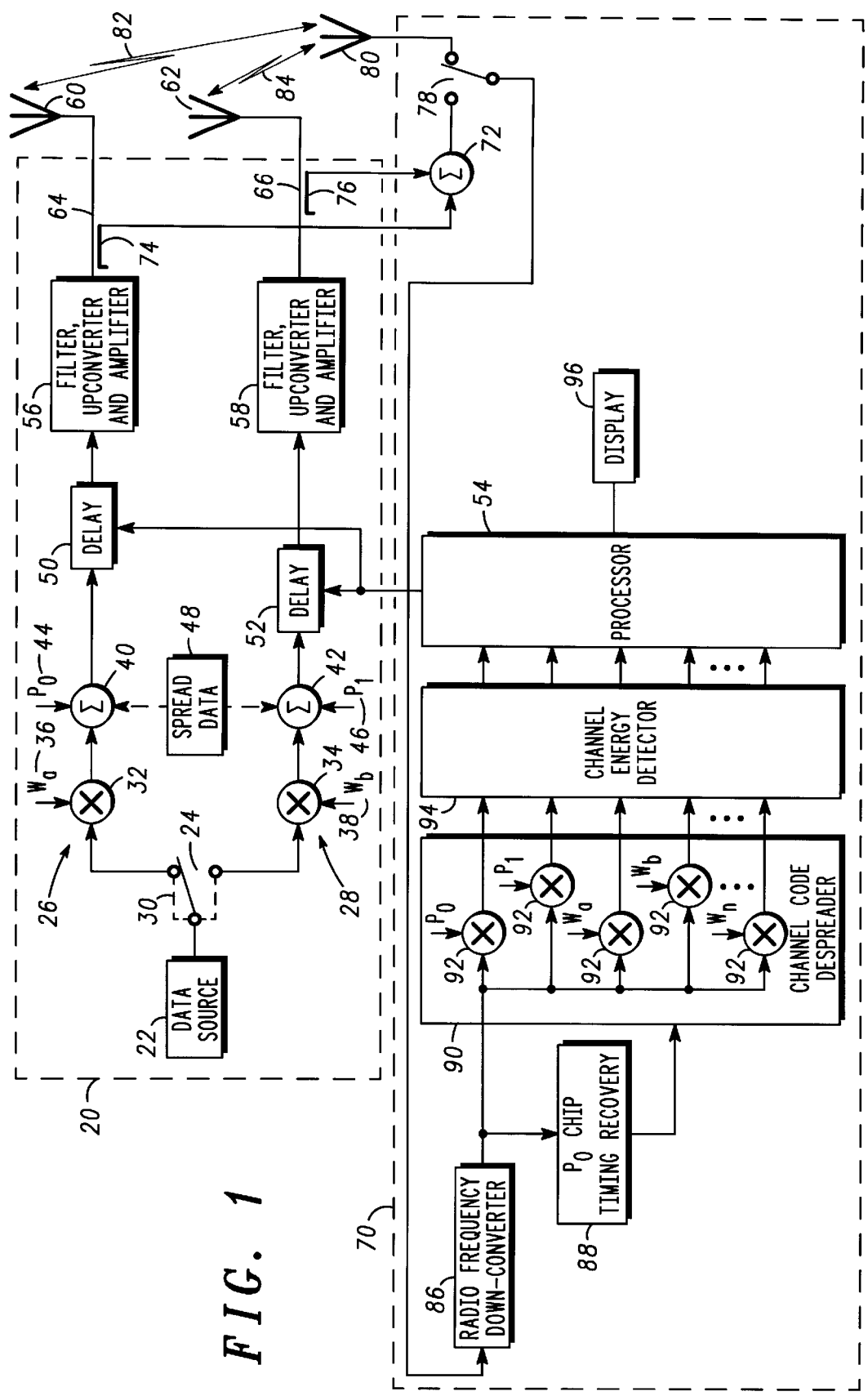
FIG. 1 is a high-level functional block diagram of an orthogonal transmit diversity transmitter and an apparatus for measuring the quality of an orthogonal transmit diversity signal in accordance with the method and system of the present invention.

With reference now to FIG. 1, there is depicted a high-level functional block diagram of an orthogonal transmit diversity transmitter and an apparatus for measuring and adjusting the quality of an orthogonal transmit diversity signal in accordance with the method and system of the present invention. As illustrated, transmitter 20 includes data source 22, which is a source of data to be transmitted to a receiver or subscriber unit. Data source 22 preferably provides a stream of bits, which may have been encoded or interleaved or otherwise processed for transmission, wherein such stream of bits represents voice, video, or other data to be transmitted to the receiving subscriber unit.

In order to obtain transmit diversity from multiple diversity antennas, multiple data streams are created from the data stream output by data source 22. In one embodiment of an orthogonal transmit diversity transmitter data bits are commutated so that every other data bit, or every other group of data bits, is output to one of the two diversity branches shown in transmitter 20. If more than two antennas are used, commutation is performed among all diversity branches in the transmitter. This commutation function may be performed by commutator 24, which alternates outputting one or more bits to diversity branches 26 and 28. To simplify the description, only two diversity branches are shown in FIG. 1.

In an alternate orthogonal transmit diversity transmitter, data streams for diversity branches 26 and 28 may contain the same data, for transmission at half the conventional power, as indicated by the dashed-line connection shown at reference numeral 30.

Data streams output by commutator 24 are coupled to spreaders 32 and 34 for spreading the data using channel spreading codes 36 and 38. These spreading codes are shown in FIG. 1 as Walsh codes $W_a$ and $W_b$, which are preferably orthogonal with respect to one another.

The output of spreaders 32 and 34 are coupled to summers 40 and 42, respectively. Summers 40 and 42 are used to add orthogonal pilot channels to the signals in diversity branches 26 and 28. These pilot channels provide a reference to the subscriber unit for detecting, receiving, and despreading signals received from diversity antennas associated with diversity branches 26 and 28. In a preferred embodiment, pilot channels 44 and 46 are selected orthogonal Walsh codes that are not modulated with data.

If multiple data channels are transmitted by transmitter 20, additional spread data for additional channels may be added in summers 40 and 42, as shown by the arrows extending from spread data 48. For example, the voice or data belonging to a second user may be summed with the spread data from data source 22 and pilot channels 44 and 46, which would produce an output from summers 40 and 42 that represents two branches of orthogonally spread data from all users, with a pilot channel for each of diversity branch.

According to an important aspect of the present invention, the signals output from spreaders 40 and 42 are coupled to delay circuits 50 and 52, respectively, for the purpose of adjusting the relative delay between the two streams of digital data. As discussed in further detail below, a signal from processor 54 may be used to set a time delay in either or both of delay circuits 50 and 52 in order to compensate for a difference in delay caused elsewhere in the transmitter and antenna system. In a preferred embodiment, delay circuits 50 and 52 are implemented with known digital delay buffers.

The outputs from delay circuits 50 and 52 are coupled to radio frequency circuits 56 and 58, respectively. These circuits perform many of the analog operations on the digital signals so that they may be transmitted from antennas 60 and 62. In a preferred embodiment, analog circuits 56 and 58 filter, up-convert, and amplify digital signals from delay circuits 50 and 52. Because these circuits are analog, the delay introduced by these circuits cannot be controlled without considerable expense in manufacturing. Thus, the outputs of analog circuits 56 and 58 may not be time aligned with respect to the digital information they carry. This difference in time alignment or difference in delay reduces the degree of orthogonality between the radio frequency diversity signals in branches 26 and 28. When orthogonality is reduced, the radio frequency channel is not as efficient because interference at the receiver is increased, which typically introduces errors in the data transmission. To compensate, forward link power is usually increased, which results in lower system capacity.

The outputs of radio frequency analog circuits 56 and 58 are transmitted via cables, or other transmission means, 64 and 66 to antennas 60 and 62, where the antennas are mounted with space between them for providing transmit diversity signals. A difference in length between cables 64 and 66 may be another way a difference in delay is introduced between the first and second radio frequency diversity signals transmitted from antennas 60 and 62. A different delay in the cables may be caused by a difference in physical or electrical length of the cables.

Also shown in FIG. 1 is signal quality measurer 70, which includes summer 72 for summing signals from radio frequency couplers 74 and 76. Couplers 74 and 76 may be implemented with any one of several known couplers that take a small part of the energy from cables 64 and 66. Note that for the purpose of this invention couplers 74 and 76 may be located in several places. For example, couplers 74 and 76 may be located within a cabinet that houses transmitter 20. The couplers may also be located in cables 64 and 66. Additionally, couplers 74 and 76 may be located near the feed points for antennas 60 and 62. In this location, couplers 74 and 76 can produce signals that represent the actual delay time between signals transmitted from antennas 60 and 62, including any delay that might be introduced by the difference in the lengths of cables 64 and 66.

Summer 72 connected to couplers 74 and 76 produces a radio frequency sample signal that represents the sum of the first and second radio frequency diversity signals in diversity branches 26 and 28, respectively. This radio frequency sample signal is coupled to switch 78, which is an optional switch that may be used to select an alternate signal from an antenna, such as antenna 80. Note that antenna 80 receives signals via propagation paths 82 and 84, and inherently sums the signals transmitted from antennas 60 and 62. In a preferred embodiment, antenna 80 is placed at a location equidistant from antennas 60 and 62 so that the delays through paths 82 and 84 are equal. Note that signal quality measurer 70 need not include switch 78; signal quality measurer 70 may produce the radio frequency sample signal with either antenna 80 or summer 72, or some embodiments may include both and use switch 78 to select the radio frequency sample signal.

The radio frequency sample signal that represents the sum of the first and second radio frequency diversity signals is input into radio frequency down-converter 86, wherein the signal is down-converted, filtered, and sampled to produce a digital data stream. The output of radio frequency down-converter 86 is a digital baseband signal, which is suitable for further processing, such as the processing done in a subscriber unit to convert the received signals into voice or user data.

The digital baseband signal output by radio frequency downconverter 86 is input into chip timing recovery circuit 88 and channel code despreader 90. Chip timing recovery circuit 88 preferably includes a searcher and a correlator for finding and producing a time reference that corresponds to the time reference used to produce radio frequency diversity signals in a selected one of diversity branches 26 or 28 in transmitter 20. Chip timing recovery circuit 88 tries to maximize the correlation between a locally generated channel spreading sequence having various time-offsets with a channel spreading sequence, such as $P_0$, that is expected in the baseband signal output by radio frequency downconverter 86. This is similar to the operation that occurs when a subscriber unit finds a pilot channel.

In addition to being coupled to the output of radio frequency downconverter 86, channel code despreader 90 is also coupled to the time reference output by chip timing recovery circuit 88. Channel code despreader 90 includes one or more channel despreading code generators, or Walsh code generators, each of which is referenced in time to the time reference output by chip timing recovery circuit 88. These channel despreading code generators are illustrated as $P_0$, $P_1$, and Walsh code generators $W_a$–$W_n$.

Within channel code despreader 90, the baseband digital output of radio frequency down-converter 86 is multiplied in one or more multipliers by the channel spreading codes, as illustrated, in order to perform one or more despreading operations. Thus, multipliers, or despreaders 92, remove the channel code spreading applied by spreaders 32 and 34 in transmitter 20.

The output of each despreader 92 is input into channel energy detector 94. The function of channel energy detector 94 is to detect energy in the despread output of each coded channel. To detect energy, each output may be integrated over an integer multiple of spreading code periods.

After detecting the energy in selected coded channels, signals representing the energy are input into processor 54. According to an important aspect of the present invention, processor 54 examines the energy in various channels, and, upon detecting energy in unused channels, produces an output proportional to a difference in delay between the first and second radio frequency diversity signals in transmitter 20. Processor 54 may be implemented with a programmable processor executing appropriate software. Alternatively, a state machine, or application specific integrated circuit may be used. Processor 54 may be used to process data representing measured characteristics of components in signals output by radio frequency down-converter 86. Processor 54 may scale data, or otherwise format data into signals for display or controlling delay circuits 50 and 52. The operation of processor 54 is discussed in more detail below.

The output of processor 54 may be displayed on display 96 so that it may be used as a metric for manually tuning the difference in delay in transmitter 20. The signal output by processor 54 may also be used to automatically adjust delay circuits 50 and 52 during the operation of transmitter 20.

If such automatic adjustment is implemented, processor 54 may programmed to select a combination of delays for delay circuits 50 and 52 that will minimize channel energy in unused channels. That is, channel code despreader 90 may use the time reference produced by chip timing recovery circuit 88 to decode or despread a channel represented by a Walsh code that was not part of the signals produced in either diversity branch 26 or diversity branch 28.

Note that if the time reference recovered by chip timing recovery circuit 88 is from diversity branch 26, then channel code despreader 90 and energy detector 94 will measure a signal characteristic of a signal produced in diversity branch 28, such as signal energy on an unused Walsh code, to produce a signal from processor 54 that is indicative of a difference in delay between the first and second radio frequency diversity signals in transmitter 20. Thus, the time reference of one diversity branch 26 is used to measure a characteristic of the signal produced in the other diversity branch 28 to indicate whether or not there is a difference in delay between the first and second radio diversity signals produced on the two diversity branches.

Figure 2:
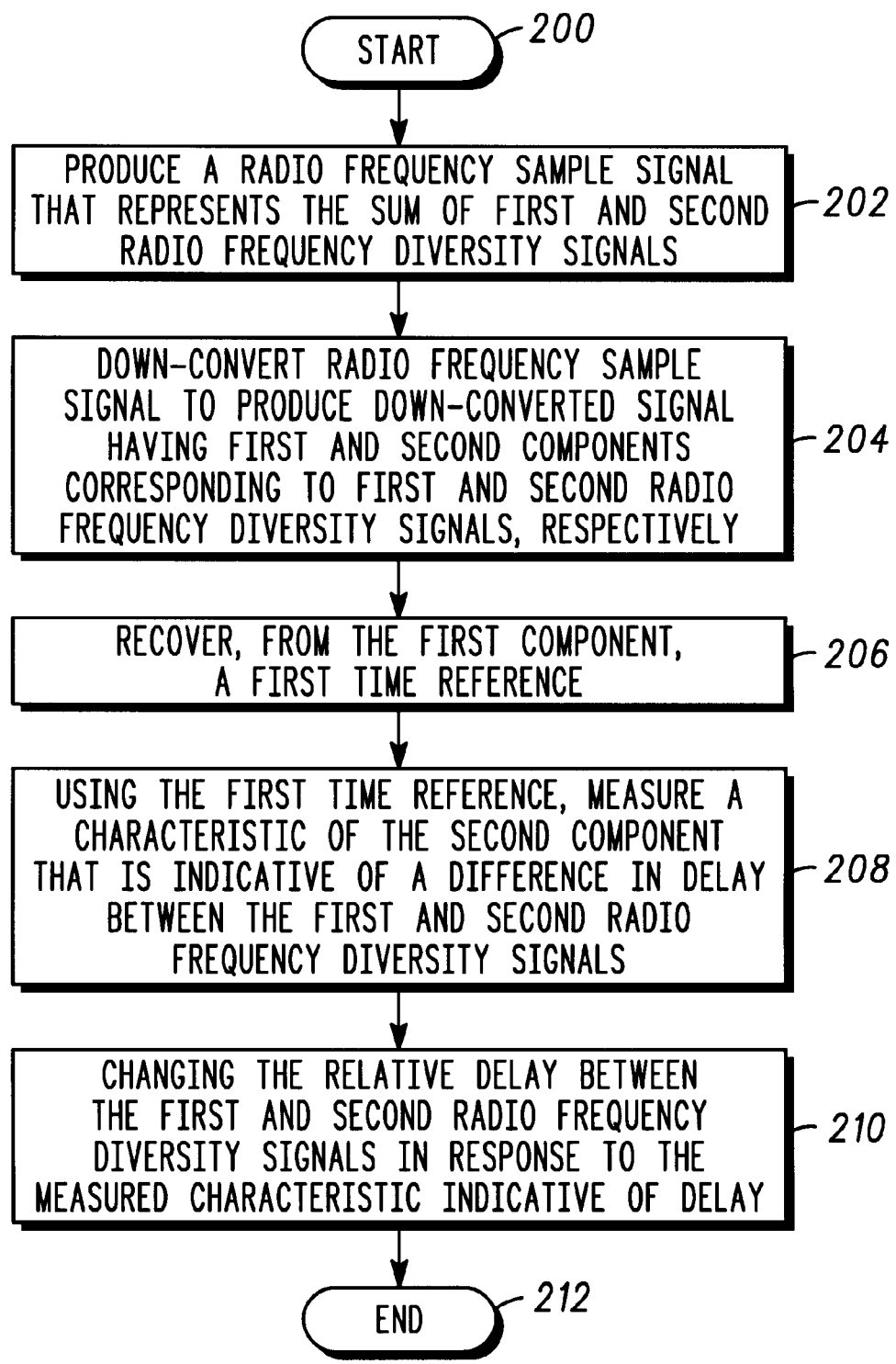
FIG. 2 is a high-level logic flowchart that illustrates the process of measuring and adjusting the quality of an orthogonal transmit diversity signal in accordance with the method and system of the present invention.

With reference now to FIG. 2, there is depicted a high-level logic flowchart that illustrates the process of measuring and adjusting the quality of an orthogonal diversity signal in accordance with the method and system of the present invention. As illustrated, the process begins at block 200, and thereafter proceeds to block 202 wherein the process produces a radio frequency sample signal that represents the sum of the first and second radio frequency diversity signals in the diversity transmitter. In one embodiment of the present invention, the first and second radio frequency diversity signals may be sampled with couplers that take a small portion of the energy from the output of the power amplifier in the diversity transmitter. These couplers may be inside the housing of the transmitter, or located in the antenna cable between the transmitter and the diversity antenna, or location near the base of the transmit diversity antennas. If the coupler is located near the base of the transmit diversity antennas, a difference in the length of the transmission line may be accounted for when the invention measures the quality of the orthogonal transmit diversity signal.

To produce the sum, an adder is used to add the signals generated by couplers. Preferably, the length of cable between each coupler and the summer should be the same so that a difference in delay is not introduced in signal quality measurer 70.

In another embodiment, the step represented at block 202 may be implemented by receiving signals transmitted by diversity antennas 60 and 62 with a sample-receiving antenna, such as antenna 80 in FIG. 1. Note that the antenna inherently includes the summing of the first and second radio frequency diversity signals. Also note that antenna 80 should be located equidistant from antennas 60 and 62 so that the propagation time from both of the diversity antennas is the same. Placing antenna 80 half way between antennas 60 and 62 is a good way to ensure the propagation delay is the same from both diversity antennas.

Next, the process down-converts the radio frequency sample signal to produce a down-converted signal having first and second components that correspond to first and second radio frequency diversity signals, respectively, within the diversity transmitter, as illustrated at block 204. This step may be implemented by using a single radio frequency down-converter that filters, down-converts, and digitally samples the radio frequency sample signal to produce a digital data stream. By using a single down-converter, any delay added by the down-conversion process will be the same for both first and second radio frequency diversity signals. As long as delay added in the quality measuring process is the same for both first and second radio frequency diversity signals, the difference in delay between the first and second diversity signals at the transmitter can still be accurately measured.

After the down-conversion step, the process recovers, from the first component corresponding to the first radio frequency diversity signal, a first time reference, as depicted at block 206. This step may be implemented with chip timing recovery circuit 88, as discussed with reference to FIG. 1, above. In a preferred embodiment, the first time reference is recovered by searching for the pilot signal from the first diversity branch, such as, for example, branch 26 in transmitter 20.

Next, the process measures a characteristic of the second component, using the time reference from the first component, wherein the characteristic is indicative of a difference in delay between the first and second radio frequency diversity signals, as illustrated at block 208. In one embodiment of the present invention, the process measures energy on a Walsh channel that is not assigned, or used, in producing the second radio frequency diversity signal, wherein the energy is measured using the first time reference recovered from the first radio frequency diversity signal.

For example, in FIG. 1, timing from the first radio frequency diversity signal may be recovered by chip timing recovery circuit 88 that searches for, and receives, pilot channel $P_0$ 44 from diversity branch 26 in transmitter 20. This timing is used to produce a channel despreading code, for example, $W_d$, which is not assigned for carrying traffic on diversity branch 28. Since channel code despreader 90 is looking for energy in a channel that was not assigned, channel energy detector 94 should not expect to find any significant energy on the unused Walsh channel if the delay between the first and second radio frequency diversity signals transmitted from antennas 60 and 62 is substantially the same, or small relative to a chip time. Conversely, if there is a difference in delay between the first and second radio frequency diversity signals, energy will appear on the unassigned Walsh channel because the reduced degree of orthogonality between diversity branches 26 and 28. Thus, the presence of energy on an unassigned Walsh channel is considered a characteristic of the second component that is indicative of a difference in delay between the first and second radio frequency diversity signals in transmitter 20.

In another embodiment of the present invention, a circuit similar to chip timing recovery circuit 88 may operate in parallel with chip timing recovery circuit 88 to recover a time reference of the second radio frequency diversity signal. In other words, chip timing recovery circuit 88 will recover the chip timing from $P_0$ 44 while, another similar circuit may recover the chip timing of $P_1$ 46. This step may be implemented with the circuit shown in FIG. 3, which is discussed in more detail below.

Once the characteristic that is indicative of delay is measured, the process changes the difference in delay between the first and second radio frequency diversity signals in the transmitter in order to reduce or eliminate it, as depicted at block 210. Reducing the relative delay increases the efficiency of the channel and performance of the orthogonal transmit diversity transmitter 20.

The step shown at block 210 may be implemented by selecting a first pair of delay values, which are executed by delay circuits 50 and 52 in FIG. 1. Then the process can measure the characteristic that is indicative of a difference in delay and store the measured metric. After measuring, a different pair of delay values may be loaded into delay circuits 50 and 52, and a second measurement may be performed to obtain a second metric indicative of the difference in delay. The two metrics may then be compared to determine whether or not the change in delay settings was a beneficial change. If the change was a beneficial change, such as one that reduces the indication of a difference in delay, processor 54 may increase the relative to delay in a similar manner to further reduce the relative delay between the first and second radio frequency diversity signals.

If the change did not improve the quality of the orthogonal transmit diversity signal, processor 54 may reverse the direction of the change in delay, and produce yet another pair of delay values for delay circuits 50 and 52 to change the delay in the other direction so that the difference in delay between the first and second radio frequency diversity signals is minimized. In the embodiment shown in FIG. 3, the step illustrated at block 210 may be performed in processor 54, which examines the output of the time comparison between time references for diversity branches 26 and 28.

After the process changes the relative delay between the first and second radio frequency diversity signals in order to minimize the effects of a difference in delays introduced in branches 26 and 28, the process ends as shown at block 212.

Figure 3:
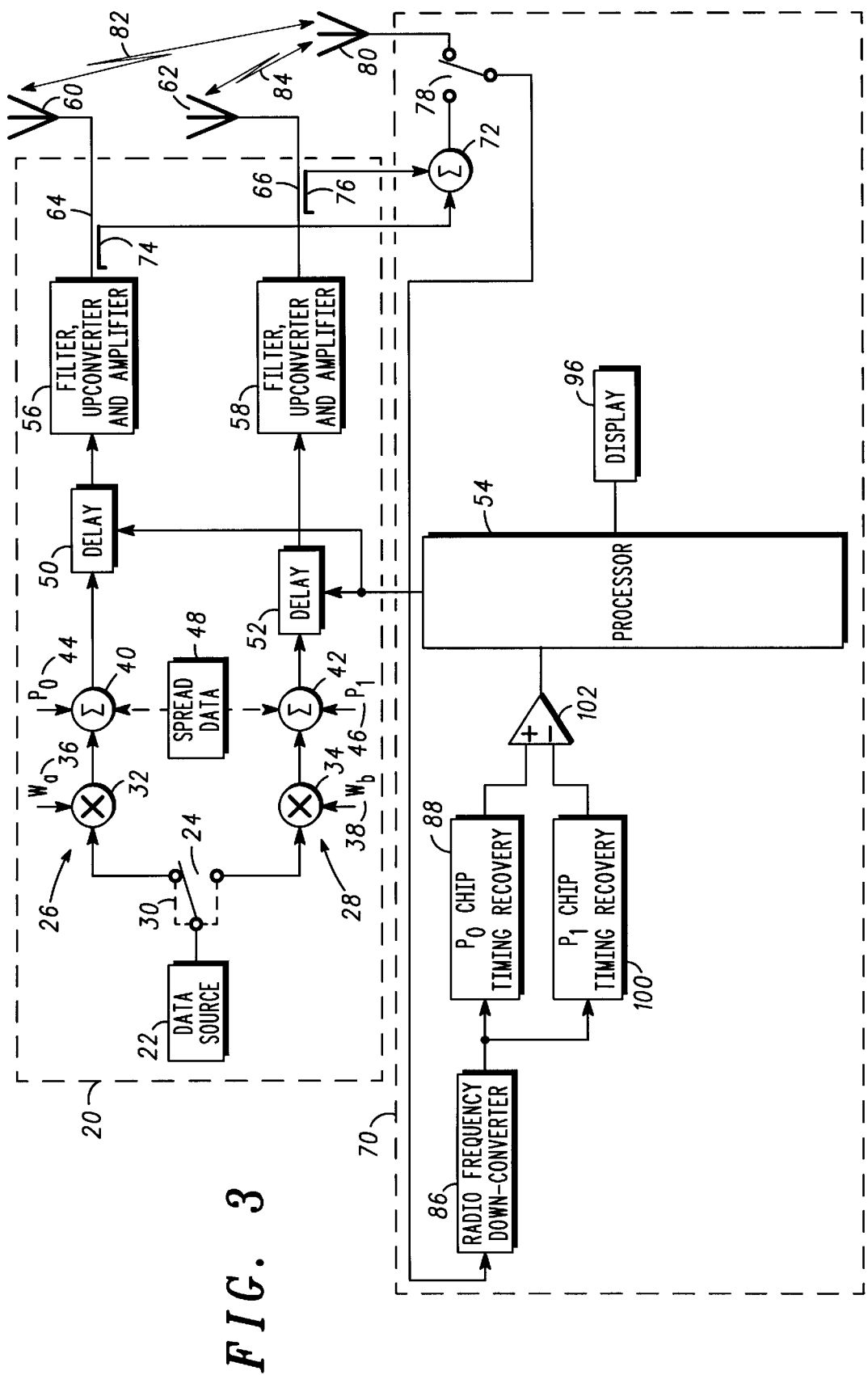
FIG. 3 is a high-level functional block diagram of an orthogonal transmit diversity transmitter and an apparatus for measuring the quality of an orthogonal transmit diversity signal.

With reference now to FIG. 3, there is shown an alternate embodiment of the present invention, which is illustrated in a high-level functional block diagram of an orthogonal transmit diversity transmitter and an apparatus for measuring the quality of an orthogonal transmit diversity signal. As shown, the baseband digital output from radio frequency down-converter 86 is input into two chip timing recovery circuits 88 and 100. As shown, chip timing recovery circuit 88 recovers a time reference from diversity branch 26 in transmitter 20 by correlating with pilot channel $P_0$ 44. Similarly, chip timing recovery circuit 100 recovers a time reference from diversity branch 28 by correlating with pilot channel $P_1$ 46.

Time references output by chip timing recovery circuit 88 and chip timing recovery circuit 100 are both input into comparator 102, which compares the two time references and outputs a signal proportional to the time difference. This signal is input to processor 54, which may then convert the signal into appropriate delay values for controlling delay circuits 50 and 52.

It should be apparent to those persons skilled in the art that the present invention may be used to detect and compensate for a difference in delay experienced by signals generated in different diversity branches of an orthogonal transmit diversity transmitter. In order to realize the maximum benefit from the orthogonal transmit diversity scheme, the delay between diversity branches must be compensated for.

In one embodiment of the present invention, orthogonality is measured as a characteristic that is indicative of a difference in delay between first and second radio frequency diversity signals in an orthogonal transmit diversity transmitter. In another embodiment, time references from each diversity branch are recovered and compared in order to change the relative delay in the diversity branches of the transmitter. The present invention also has the benefit of avoiding changing the difference in delay between first and second radio frequency diversity signals due to delays in analog portions of the signal quality measurer. Any delay added in the signal quality measurer is added equally to both first and second transmit diversity signals.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determnined by the appended claims when interpreted in accordance with the breadth to which they are fairly, legally, and equitably entitled.

What is claimed is:

1. A method of measuring the quality of an orthogonal transmit diversity signal in a wireless communications system, wherein the orthogonal transmit diversity signal is produced by a transmitter having first and second radio frequency diversity signals for transmitting from first and second transmit diversity antennas, the method comprising the steps of:

producing a radio frequency sample signal that represents the sum of the first and second radio frequency diversity signals;

down-converting the radio frequency sample signal to produce a down-converted signal having first and second components corresponding to the first and second radio frequency diversity signals, respectively;

recovering, from the first component, a first time reference of the first radio frequency diversity signal; and using the first time reference, measuring a characteristic of the second component that is indicative of a difference in delay between the first and second radio frequency diversity signals, wherein the step of producing a radio frequency sample signal that represents the sum of the first and second radio frequency diversity signals further includes:

coupling to the first radio frequency diversity signal to produce a first sampled signal;

coupling to the second radio frequency diversity signal to produce a second sampled signal; and summing the first and second sampled signals to produce a radio frequency sample signal that represents the sum of the first second radio frequency diversity signals.

2. The method for measuring the quality of an orthogonal transmit diversity signal according to claim 1 wherein the step of measuring a characteristic of the second component that is indicative of a difference in delay between the first and second radio frequency diversity signals further includes despreading the down-converter signal using a spreading code that is associated with the second radio frequency diversity signal, and generated using the first time reference, to produce an orthogonality metric signal that is indicative of a difference in delay between the first and second radio frequency diversity signals.

3. The method for measuring the quality of an orthogonal transmit diversity signal according to claim 1 wherein the step of measuring a characteristic of the second component that is indicative of a difference in delay between the first and second radio frequency diversity signals further includes:

recovering, from the second component, a second time reference of the second radio frequency diversity signal; and comparing the times of the first and second time references.

4. The method for measuring the quality of an orthogonal transmit diversity signal according to claim 1 wherein the step of producing a radio frequency sample signal that represents the sum of the first and second radio frequency diversity signals further includes receiving, with an antenna, signals transmitted from the first and second transmit diversity antennas to produce a radio frequency sample signal that represents the sum of the first and second radio frequency diversity signals.

5. The method for measuring the quality of an orthogonal transmit diversity signal according to claim 1 further including the step of changing the relative delay between the first and second radio frequency diversity signals in response to the measured characteristic of the second component that is indicative of a difference in delay between the first and second radio frequency diversity signals.

6. The method for measuring the quality of an orthogonal transmit diversity signal according to claim 1 further including the step of displaying the measured characteristic of the second component that is indicative of a difference in delay between the first and second radio frequency diversity signals.

7. A system for measuring the quality of an orthogonal transmit diversity signal in a wireless communications system, wherein the orthogonal transmit diversity signal is produced by a transmitter having first and second radio frequency diversity signals for transmitting from first and second transmit diversity antennas, the system comprising:

means for producing a radio frequency sample signal that represents the sum of the first and second radio frequency diversity signals;

means for down-converting the radio frequency sample signal to produce a down-converted signal having first and second components corresponding to the first and second radio frequency diversity signals, respectively;

means for recovering, from the first component, a first time reference of the first radio frequency diversity signal; and means for measuring a characteristic of the second component that is indicative of a difference in delay between the first and second radio frequency diversity signals using the first time reference, wherein the means for producing a radio frequency sample signal that represents the sum of the first second radio frequency diversity signals further includes:

means for coupling to the first radio frequency diversity signal to produce a first sampled signal;

means for coupling to the second radio frequency diversity signal to produce a second sampled signal; and means for summing the first and second sampled signals to produce a radio frequency sample signal that represents the sum of the first and second radio frequency diversity signals.

8. The system for measuring the quality of an orthogonal transmit diversity signal according to claim 7 wherein the means for measuring a characteristic of the second component that is indicative of a difference in delay between the first and second radio frequency diversity signals further includes means for despreading the down-converted signal using a spreading code that is associated with the second radio frequency diversity signal, and generated using the first time reference, to produce an orthogonality metric signal that is indicative of a difference in delay between the first and second radio frequency diversity signals.

9. The system for measuring the quality of an orthogonal transmit diversity signal according to claim 7 wherein the means for measuring a characteristic of the second component that is indicative of a difference in delay between the first and second radio frequency diversity signals further includes:

means for recovering, from the second component, a second time reference of the second radio frequency diversity signal; and means for comparing the times of the first and second time references.

10. The system for measuring the quality of an orthogonal transmit diversity signal according to claim 7 wherein the means for producing a radio frequency sample signal that represents the sum of the first and second radio frequency diversity signals further includes an antenna for receiving signals transmitted from the first and second transmit diversity antennas to produce a radio frequency sample signal that represents the sum of the first and second radio frequency diversity signals.

11. The system for measuring the quality of an orthogonal transmit diversity signal according to claim 7 further including means for changing the relative delay between the first and second radio frequency diversity signals in response to the measured characteristic of the second component that is indicative of a difference in delay between the first and second radio frequency diversity signals.

12. The system for measuring the quality of an orthogonal transmit diversity signal according to claim 7 further including means for displaying the measured characteristic of the second component that is indicative of a difference in delay between the first and second radio frequency diversity signals.

13. A signal quality measurer for measuring the quality of an orthogonal transmit diversity signal in a wireless communications system, wherein the orthogonal transmit diversity signal is produced by a transmitter having first and second radio frequency diversity signals for transmitting from first and second transmit diversity antennas, the signal quality measurer comprising:

means for producing a radio frequency sample signal that represents the sum of the first and second radio frequency diversity signals;

a down-converter the radio frequency sample signal to produce a down-converted signal having first and second components corresponding to the first and second radio frequency diversity signals, respectively;

a chip timing recovery circuit for recovering, from the first component, a first time reference of the first radio frequency diversity signal; and means for measuring a characteristic of the second component that is indicative of a difference in delay between the first and second radio frequency diversity signals using the first time reference, wherein the means for producing a radio frequency sample signal that represents the sum of the first and second radio frequency diversity signals further includes:

means for coupling to the first radio frequency diversity signal to produce a first sampled signal;

means for coupling to the second radio frequency diversity signal to produce a second sampled signal; and means for summing the first and second sampled signals to produce a radio frequency sample signal that represents the sum of the first and second radio frequency diversity signals.

14. The signal quality measurer according to claim 13 wherein the means for producing a radio frequency sample signal that represents the sum of the first and second radio frequency diversity signals further includes an antenna for receiving the first and second radio frequency diversity signals.

* * * * *